(12) United States Patent
Gore

(10) Patent No.: US 8,970,558 B1
(45) Date of Patent: Mar. 3, 2015

(54) DIGIT APPARATUS FOR TYPING AND TEXTING

(76) Inventor: Damaris Dixie-Rose Gore, Houston, TX (US)

( * ) Notice: Subject to any disclaimer, the term of this patent is extended or adjusted under 35 U.S.C. 154(b) by 0 days.

(21) Appl. No.: 13/012,735

(22) Filed: Jan. 24, 2011

Related U.S. Application Data

(60) Provisional application No. 61/298,541, filed on Jan. 26, 2010.

(51) Int. Cl.
*G06F 3/033* (2013.01)
*G09G 5/00* (2006.01)
*A46B 5/02* (2006.01)
*B43K 1/10* (2006.01)

(52) U.S. Cl.
USPC ................ 345/179; 345/156; 401/8; 401/258

(58) Field of Classification Search
None
See application file for complete search history.

(56) References Cited

U.S. PATENT DOCUMENTS

| | | | | |
|---|---|---|---|---|
| 4,907,297 | A * | 3/1990 | Gallucci | 2/163 |
| 5,295,948 | A * | 3/1994 | Gray | 602/5 |
| 6,029,277 | A | 2/2000 | Picchione, II | |
| 7,578,006 | B2 * | 8/2009 | Garneau | 2/161.1 |
| 2003/0031496 | A1 * | 2/2003 | Schneider | 401/8 |
| 2005/0231471 | A1 * | 10/2005 | Mallard et al. | 345/156 |
| 2007/0061942 | A1 * | 3/2007 | Schrodl | 2/159 |
| 2009/0289893 | A1 * | 11/2009 | Drangel et al. | 345/156 |
| 2010/0243974 | A1 * | 9/2010 | Jaeger | 254/133 R |
| 2011/0012870 | A1 | 1/2011 | Pena | |

OTHER PUBLICATIONS http://www.mytextees.com.

* cited by examiner

*Primary Examiner* — Jimmy H Nguyen
*Assistant Examiner* — Kwin Xie
(74) *Attorney, Agent, or Firm* — Buskop Law Group, PC; Wendy Buskop

(57) ABSTRACT

A digit hood to enable a user to quickly and accurately actuate keys of a hand held device. The digit hood can include a cover configured to be disposed over a digit. The cover can include an opening configured to receive the digit. One or more raised protrusions can extend from the cover and away from the digit for actuating the keys of the hand held device. A plurality of joint holes can be disposed through the cover to allow the digit to bend. A plurality of ventilation holes can be disposed through the cover to provide ventilation to the digit.

19 Claims, 9 Drawing Sheets

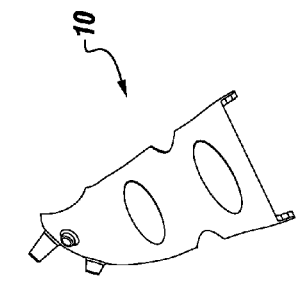
FIGURE 1C
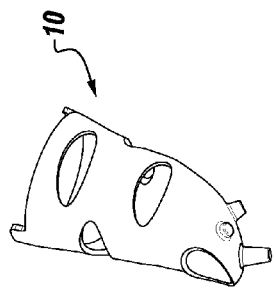
FIGURE 1F
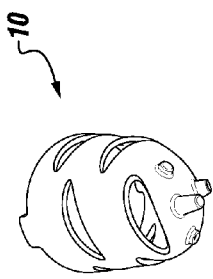
FIGURE 1I
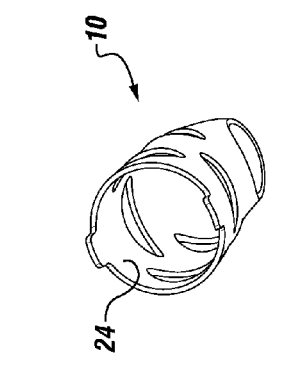
FIGURE 1B
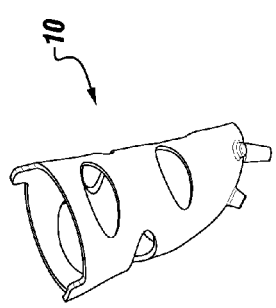
FIGURE 1E
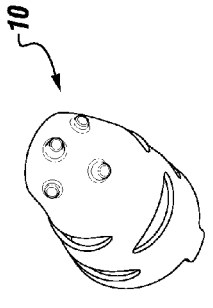
FIGURE 1H
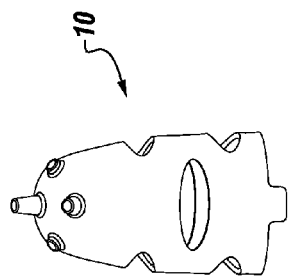
FIGURE 1A
FIGURE 1D
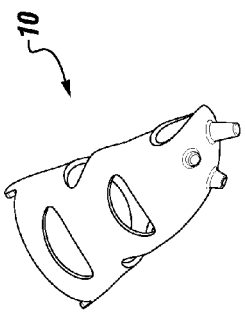
FIGURE 1G

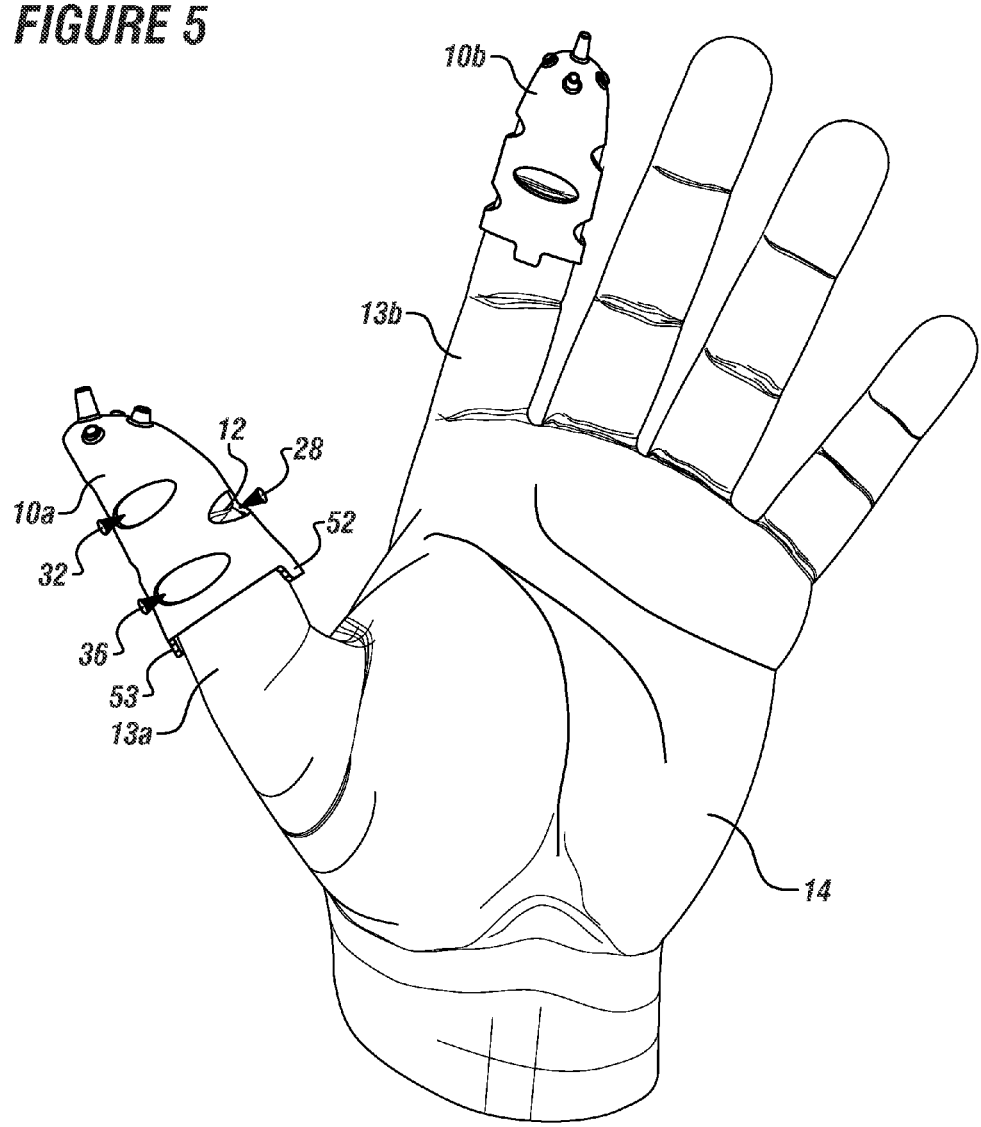

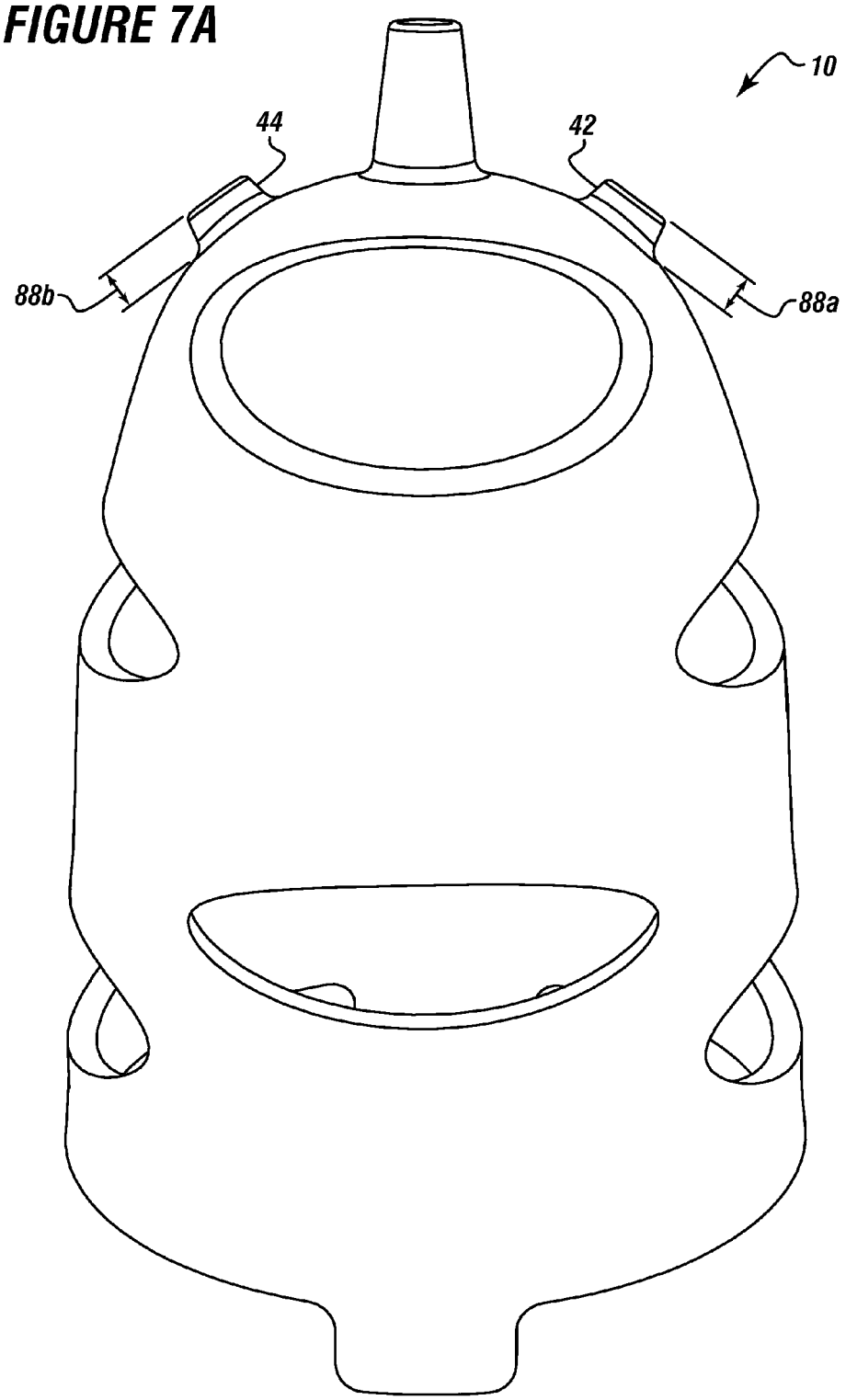

DIGIT APPARATUS FOR TYPING AND TEXTING

CROSS REFERENCE TO RELATED APPLICATIONS

The present application claims priority to and the benefit of U.S. Provisional Patent Application Ser. No. 61/298,541 filed on Jan. 26, 2010, entitled "TEEZEASE/KEEZEASE". This reference is hereby incorporated in its entirety.

FIELD

The present embodiments generally relate to a digit therapeutic support apparatus.

BACKGROUND

A need exists for an apparatus that allows a user to type on a keyboard of a hand held device comfortably, ergonomically, quickly, and accurately, without overstraining the user's digits.

A need exists for an apparatus that does not exacerbate preexisting conditions, such as a hyperextension deformity.

A need exists for an apparatus that can promote the healing process for preexisting conditions, such as a repetitive stress injuries.

A need exists for an apparatus that allows a user to roll his or her digits over keys of a hand held device for fast and accurate texting without requiring as much digit movement as in traditional texting.

A need exists for an apparatus that can reduce or prevent the occurrence of physical stress related digit injuries that can occur from the regular use of hand held devices.

The present embodiments meet these needs.

BRIEF DESCRIPTION OF THE DRAWINGS

The detailed description will be better understood in conjunction with the accompanying drawings as follows FIGS. 1A-1I depict various views of a digit hood.

FIG. 5 depicts a hand having two digit hoods disposed on two different fingers.

FIGS. 7A-7B depict heights of various raised protrusions on the digit hood.

Figure 2:
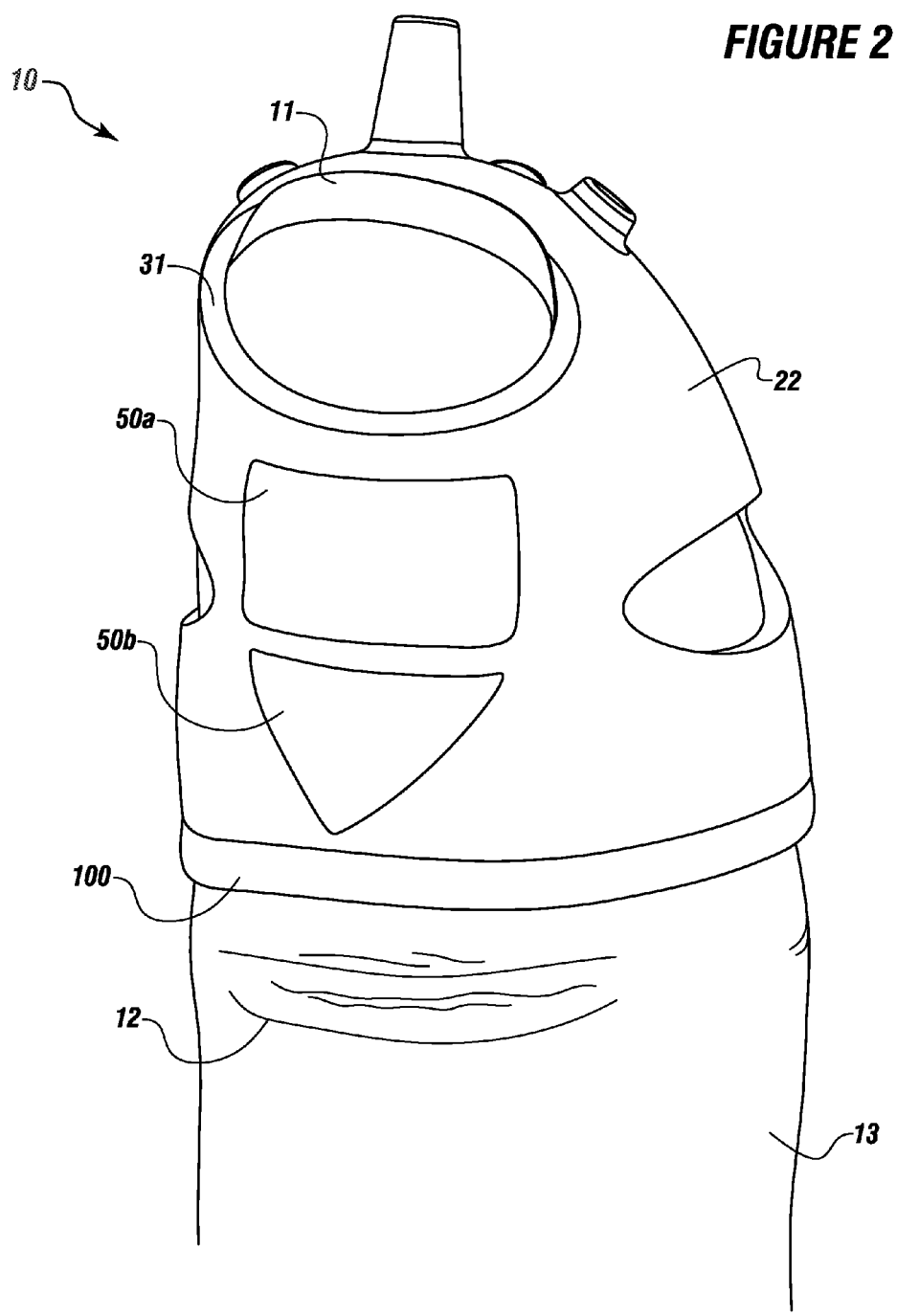
FIG. 2 depicts a top view of a digit hood having marketing areas.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a digit apparatus for typing and texting, which can be a therapeutic digit support apparatus. The therapeutic digit support apparatus can be used to allow a user to type on a keyboard of a hand held device comfortably, ergonomically, quickly, and accurately, without overstraining the user's digits.

The digit apparatus can be used for manual communication or other physical activity using hand held devices. The digit hood can allow user's to avoid the physical dangers of key actuation, which can include permanent muscle tearing, thumb carpometacarpal joint arthritis, bursitis, carpal tunnel syndrome, tendonitis, stress fractures, hyperextension deformity, and a myriad of other degenerative conditions.

Small, fine movements coupled with small buttons can lead to injury, as smaller buttons can be harder to activate and can require more finesse. These movements can potentially cause a lack of blood flow to the tendons and muscles of the thumb or another digit, and can potentially cause inflammation of joints, such as those at the base of the thumb.

For example, the digit hood can be used to avoid the occurrence of "BlackBerry Thumb" or "iPod Digit", which, according to the American Physical Therapy Association (APTA), is a condition that has symptoms including pain or numbness in the thumbs and joints of the hands. Due to the small size of keyboards of many hand held devices, in combination with the less dexterous nature of the thumb, the thumb can be overstressed from being utilized for regular and fast texting and typing. Also, the digit hood can be used to avoid aggravating already existing arthritis and other maladies.

As such, the digit hood can function as a positional ergonomic aid that can relieve pain from existing maladies, prevent further damage to existing maladies, and/or prevent the exacerbation of maladies due to the lack of proper ergonomic form.

The digit hood can provide handicapped individuals that have limited dexterity, malformed thumbs, and/or digits with an apparatus for properly actuating keys of hand held devices.

The digit hood can force users to attain and maintain proper hand, wrist, and thumb positioning; thereby potentially preventing thumb carpometacarpal joint arthritis, Bursitis, Carpal Tunnel Syndrome, Tendonitis, stress fractures, and hyperextension deformity. For example, the digit hood can force users to attain and maintain proper hand, wrist, and thumb positioning by allowing a user to hold their thumbs in a natural and ergonomic position during texting and/or typing, as such the user's hand and wrist will necessarily be in a natural and ergonomic position as well.

One or more embodiments relate to a digit hood for enabling a user to quickly and accurately actuate keys of a hand held device. The digit hood can include a cover configured to be disposed over at least a portion of a digit of the user. In one or more embodiments, the digit hood can cover the whole digit, or just a portion of the digit.

The cover can include an opening configured to receive the digit. The cover can have a cover inside and a cover outside.

One or more raised protrusions can extend from the cover and away from the digit when the cover is disposed over the digit. The raised protrusions can be configured to actuate the keys of the hand held device. For example, a user can engage the keys with the raised protrusions to depress the keys for typing and/or texting. The raised protrusions can be raised points, stylus, or the like.

Each raised protrusion can have a tapered cylindrical shape, a bulbous circular shape, a cylindrical shape, or a circular shape. Each raised protrusion can taper away from the cover. Each raised protrusion can be connected from the cover inside to the cover outside.

Each raised protrusion can be made of a rubber, urethane, a non-slip material, or the like. For example, each raised protrusion can be made of a rubber or another material having a durometer of 35.

In one or more embodiments, each raised protrusion can be embedded within the cover, attached to the cover, molded with the cover, or otherwise connected to the cover.

Each raised protrusion can have a non-deformable surface for engagement with the keys. Each non-deformable surface can be a polymer, a rubber, or a graphite. In operation, when the digit hood is disposed over the digit of the user, the digit hood can be configured to allow the user to quickly and accurately actuate the keys to type at a rate of at least 40 words per minute with an accuracy of 95 percent.

Each non-deformable surface can be configured as a dip or an inverted cup, thereby providing non-slip functionality to the non-deformable surface. Each raised protrusion can have a concave tip, a scored tip, a suction cup tip, or a tip made of a non-slip material, which can be configured to grab the keys of a keyboard. As such, the concave tip, scored tip, suction cup tip, or tip made of a non-slip material can allow the user to engage the keys without the raised protrusion slipping off of the keys.

In one or more embodiments, each raised protrusion can extend from a pad side of the cover. The pad side of the cover can be the portion of the cover that can be disposed proximate the pad of the digit when the digit hood is disposed over the digit.

One or more joint holes can be disposed through the cover. Each joint hole can be configured to be disposed proximate a joint of the digit when the cover is disposed over the digit to allow the digit to bend. For example, the cover can include a plurality of joint holes, including a first joint hole disposed through the cover and a second joint hole disposed through the cover opposite the first joint hole.

The digit hood can include one or more ventilation holes, such as a plurality of ventilation holes disposed through the cover. Each ventilation hole can be configured to provide ventilation to the digit.

Each ventilation hole and each joint hole can have an elliptical shape or another shape.

The digit hood can include a slit disposed through the cover. The slit can be configured to receive a fingernail or thumbnail of the digit.

The digit hood can include one or more tongues disposed on a perimeter of the opening. The digit hood can include a band of material proximate or about the perimeter. Each tongue can be connected to the band of material, can be an integral part of the band of material, can be connected directly to the cover, or can be an integral part of the cover. The band of material can be about 6 millimeters in height and can be disposed about 4 millimeters from the slit.

Each tongue can be configured to be gripped by the user for engaging the cover over the digit. Each tongue can have a width of about 1000 millimeters and a length of about 6 millimeters, or can be any size depending on the particular application. Each tongue can be made of a material that has a tensile strength that is higher than a tensile strength of a material that the cover is made of. The cover can be made of multiple materials have varying tensile strengths.

In one or more embodiments, the cover can include a digit pad side having a digit pad side apex. One or more raised protrusions can be connected to the cover at the digit pad side apex. The digit pad side apex can be disposed at an apex of the digit when the digit hood is disposed on the digit. A first raised protrusion can be connected to the cover at the digit pad side apex.

The raised protrusions of the digit hood can have varying heights. The heights of the raised protrusions can function to raise the users thumbs and/or digits up from the keys of the hand held device, thus providing more space for the user to actuate the specific keys of the hand held device.

While wearing the digit hood, the user can actuate keys of the hand held device with one or both thumbs and/or with one or multiple digits. The user can use the raised protrusions to actuate the keys. Biomechanics can then gently force the user's hand and wrist to attain and maintain a proper ergonomic position.

FIGS. 1A-1I each depict the digit hood 10 from various angles.

FIG. 1A depicts a bottom view of the digit hood 10.

FIG. 1B depicts a rear view of the digit hood 10 showing the cover inside 24.

FIG. 1C depicts a first side view of the digit hood 10.

FIG. 1D depicts a top view of the digit hood 10.

FIG. 1E depicts a another side view of the digit hood 10.

FIG. 1F depicts another side view of the digit hood 10 from a different angle than FIG. 1E.

FIG. 1G depicts a side view of the digit hood 10 showing a portion of the front of the digit hood 10.

FIG. 1H depicts a front view of the digit hood 10.

FIG. 1I depicts another front view of the digit hood 10.

In one or more embodiments, the digit hood 10 can have a tensile strength ranging from about 20 to about 60.

FIG. 2 depicts an embodiment of a top side view of the digit hood 10 with the cover 22 having an attachment device 100 disposed at a perimeter of the cover 22. The attachment device 100 can be disposed just above a joint 12 of a digit 13. The attachment device 100 can function to maintain the digit hood 10 in engagement with the digit 13.

The attachment device 100 can be a semi-rigid band made of a pliable elastic material, an adjustable strap, or the like. In embodiments having the adjustable strap, the digit hood 10 can have a flap, allowing the digit hood 10 to be partially opened for inserting onto the digit 13, after which, the adjustable strap can be used to close the flap.

The cover 22 can be configured to be disposed over at least a portion of the digit 13 of a user.

The cover 22 can be an elastomeric cover made of a pliable rubber, a pliable elastomeric material, Neoprene™, a textile mixture, or combinations thereof. In one or more embodiments, the cover 22 can be configured to have an ability to roll onto itself without sticking.

The digit hood 10 can have a slit 31 that can receive a nail 11 of the digit 13. For example, as the user rolls the digit hood 10 onto the digit 13, the nail 11 can pass into and through the slit 31.

In one or more embodiments, the slit 31 can have a width ranging from about 1.5 millimeters to about 2 millimeters, a length ranging from about 4 millimeters to about 6 millimeters, and a curved shape.

The digit hood 10 can also have one or more marketing areas disposed thereon, such as a first marketing area 50a and a second marketing area 50b. The marketing areas 50a and 50b can have marketing images and text imprinted thereon.

The first marketing area 50a can be a raised rectangular portion with edges that are about 1 millimeter tall, about 1 millimeter in a first width, and about 8 millimeters in a second width. The first marketing area 50a can be used for user vanity items, such as glued on emblems, initials, flags, letters, or the like.

The second marketing area 50b can be a raised inverted triangle that can be about 1 millimeter tall. Each side of the raised inverted triangle can have a length of about 6 millimeters. An overall length of the raised inverted triangle can be about 1,500 millimeters. The raised inverted triangle can have glued on emblems, initials, flags, letters, or the like.

Figure 3A:
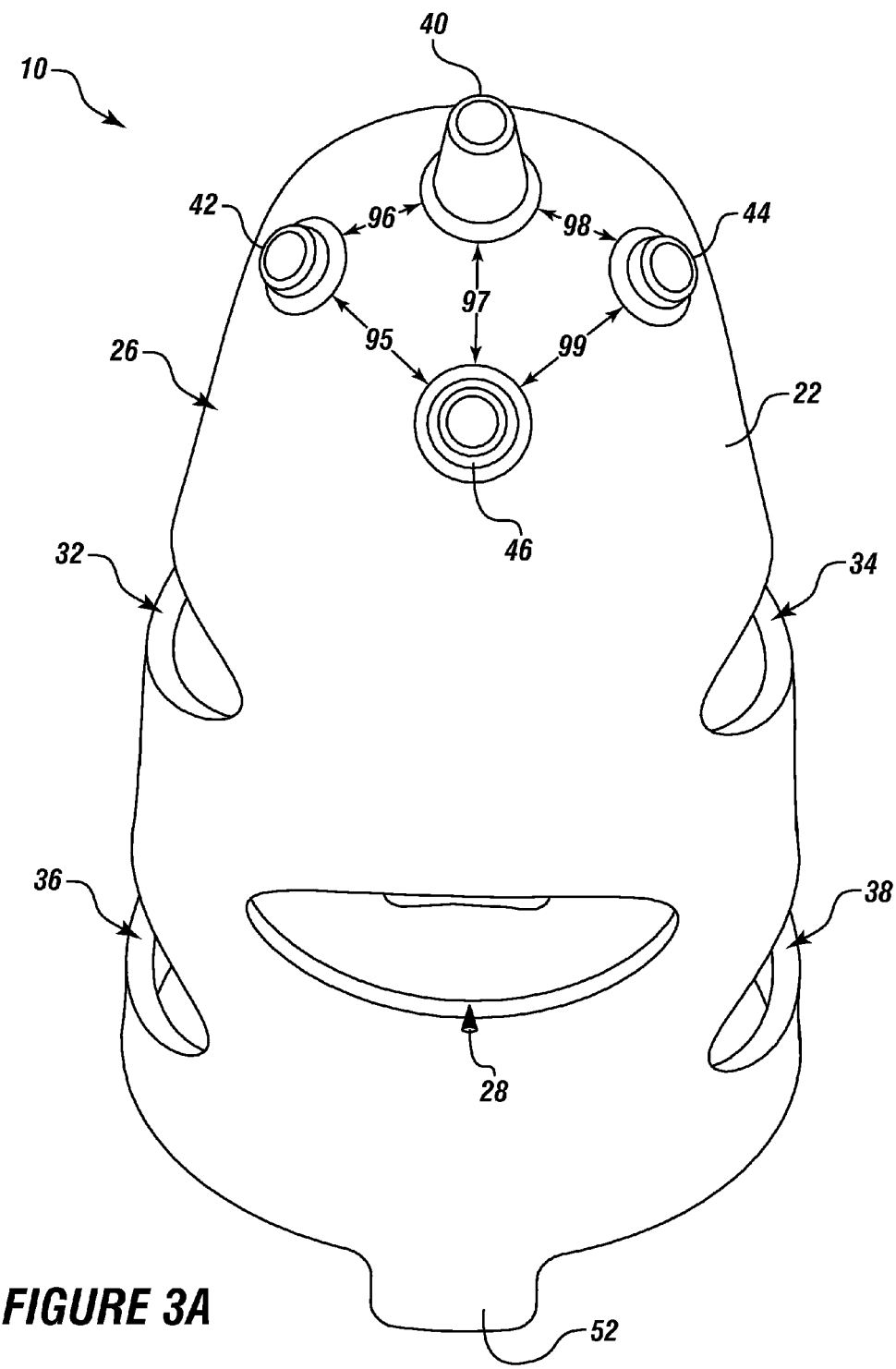
FIGS. 3A-3B depict an embodiment of a digit hood showing the arrangement and configuration of the raised protrusions.
Figure 3B:
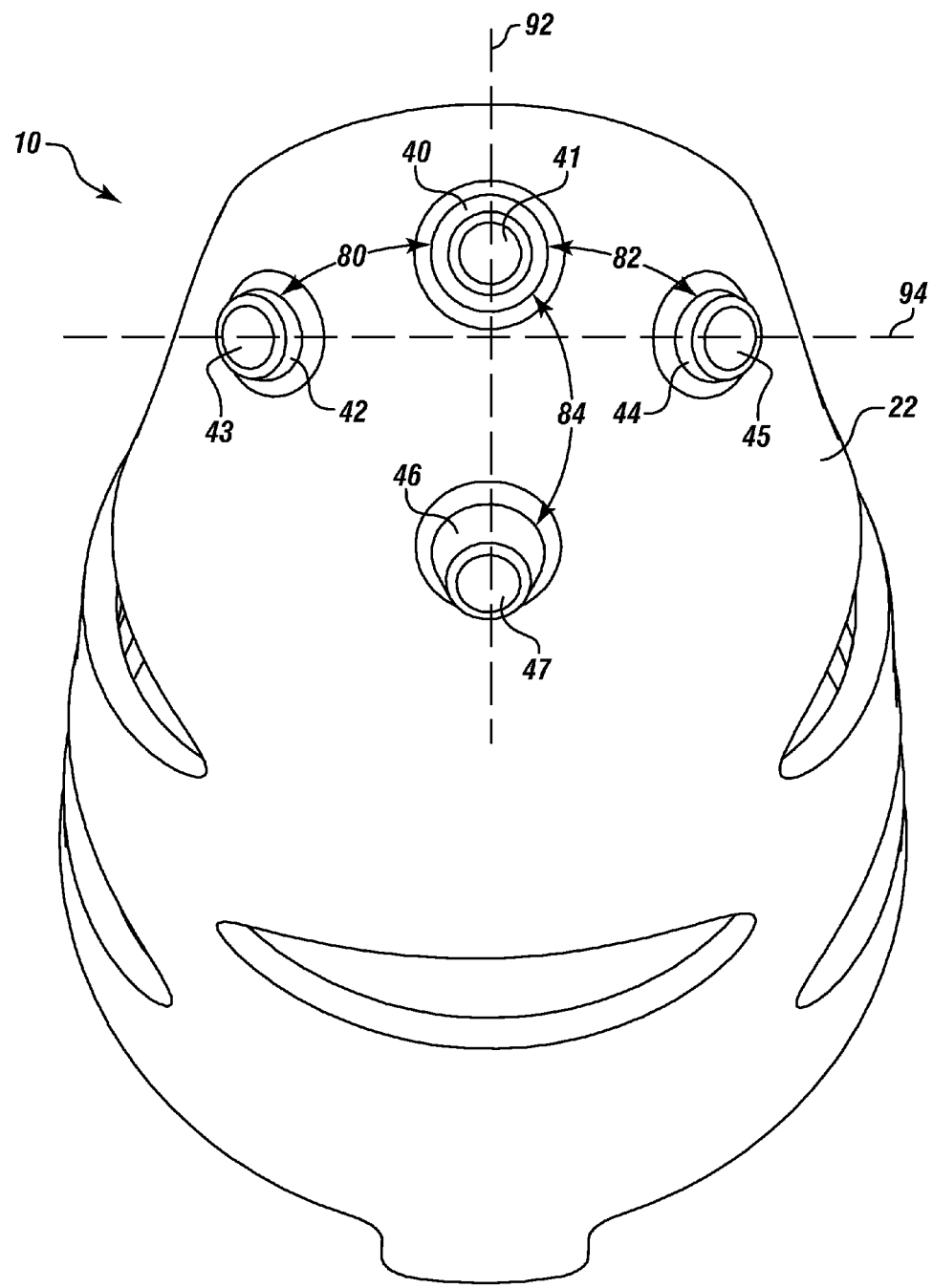

FIGS. 3A-3B depict the digit hood 10 without a digit disposed therein, and show the arrangement and configuration of the raised protrusions on the digit hood 10.

Referring to both FIGS. 3A and 3B, the digit hood 10 can have a first joint hole 28 disposed through the cover 22. The first joint hole 28 can be configured to be disposed proximate a joint of the digit when the cover 22 is disposed over the digit to allow the digit to bend. The cover 22 can have a cover outside 26.

In operation, when the user bends the user's digit, the first joint hole 28 can allow the cover 22 to bend, thereby allowing the digit to correspondingly bend.

The digit hood 10 can have a plurality of ventilation holes disposed through the cover 22, including a first ventilation hole 32, a second ventilation hole 34, a third ventilation hole 36, and a fourth ventilation hole 38. Each ventilation hole 32, 34, 36, and 38 can be configured to provide ventilation to digits. For example, each ventilation hole 32, 34, 36, and 38, can expose skin of the digit to air circulation. Each ventilation hole 32, 34, 36, and 38 and each joint hole 28 can have an elliptical shape or another shape.

The digit hood 10 can have a first tongue 52 to aid in putting the digit hood 10 on the digit.

In operation, to engage the digit hood 10 over the digit, the user can utilize one or more tongues, such as the first tongue 52. The user can grip the first tongue 52, such as with another hand, and pull upon the first tongue 52 and any other tongue to dispose the digit hood 10 over the digit. As such, each tongue 52 can aid the user in positioning the digit hood 10 onto the user's digit, such as after the digit hood 10 is rolled over the digit for engagement thereon. A similar operation can be followed to engage other digit hoods over other digits on the hand.

The digit hood 10 can include a first raised protrusion 40. The first raised protrusion 40 can extend upwards from the cover outside 26. The first raised protrusion 40 can be configured to actuate keys of a hand held device.

The digit hood 10 can have a second raised protrusion 42 extending from the cover outside 26 and away from any digit when the cover 22 is disposed over a digit. The second raised protrusion 42 can be configured to actuate keys of a hand held device.

The digit hood 10 can have a third raised protrusion 44 extending from the cover outside 26 and away from any digit when the cover 22 is disposed over a digit. The third raised protrusion 44 can be configured to actuate keys of a hand held device.

The digit hood 10 can have a forth raised protrusion 46 extending from the cover outside 26 and away from any digit when the cover 22 is disposed over a digit. The forth raised protrusion 44 can be configured to actuate keys of a hand held device.

In one or more embodiments, each raised protrusion 40, 42, 44, and 46 can have a diameter ranging from about 1.5 millimeters to about 3 millimeters.

Each of the raised protrusions 40, 42, 44, and 46 can have a tapered cylindrical shape. Each raised protrusion 40, 42, 44, and 46 can taper away from the cover 22.

Each of the raised protrusions 40, 42, 44, and 46 can have a non-deformable surface, including a first non-deformable surface 41, a second non-deformable surface 43, a third non-deformable surface 45, and a fourth non-deformable surface 47. The non-deformable surfaces 41, 43, 45, and 47 can be used to engage with the keys of a hand held device. Each non-deformable surface 41, 43, 45, and 47 can be a polymer, a rubber, or a graphite. The non-deformable surfaces 41, 43, 45, and 47 can be concaves, suction cups, scored surfaces, non-stick surfaces, or the like.

In one or more embodiments, each raised protrusion 40, 42, 44, and 46 can be connected from a cover inside to the cover outside 26. For example, each raised protrusion 40, 42, 44, and 46 can be connected to the cover inside and can extend through the cover 22 past the cover outside 26, or the raised protrusions can be molded with the cover as a one-piece structure.

In operation, when the digit hood 10 is disposed over a digit of a user, the digit hood 10 can be configured to allow the user to quickly and accurately actuate the keys to type at a rate of at least 40 words per minute with an accuracy of 95 percent using the non-deformable surfaces 41, 43, 45, and 47.

The first raised protrusion 40 and the fourth raised protrusion 46 are both depicted disposed along a first axis 92.

The second raised protrusion 42 and the third raised protrusion 44 are both depicted disposed along a second axis 94.

The second axis 94 can intersect with the first axis 92 between the first raised protrusion 40 and the fourth raised protrusion 46. As such, the raised protrusions 40, 42, 44, and 46 can be configured and arranged to form a t-shaped arrangement.

The second raised protrusion 42 can be oriented at a first angle 80 from the first raised protrusion 40. The second raised protrusion 42 can be spaced apart from the first raised protrusion 40, such as at a first distance 96.

The third raised protrusion 44 can be oriented at a second angle 82 from the first raised protrusion 40. The third raised protrusion 44 can be spaced apart from the first raised protrusion 40, such as at a second distance 98. The third raised protrusion 44 can be spaced apart from the second raised protrusion 42. The third raised protrusion 44 and the second raised protrusion 42 can be equidistantly spaced apart from the first axis 92.

The fourth raised protrusion 46 can be oriented at a third angle 84 from the first raised protrusion 40. The fourth raised protrusion 46 can be spaced apart from the first raised protrusion 40 at a third distance 97. The fourth raised protrusion 46 can be spaced apart from the second raised protrusion 42 at a fourth distance 95. The fourth raised protrusion 46 can be spaced apart from the third raised protrusion 44 at a fifth distance 99. The fourth distance 95 and the fifth distance 99 can be equivalent.

In one or more embodiments, each angle 80, 82, and 84 can range from about forty five degrees to about sixty degrees.

In one or more embodiments, the first distance 96 can be equal to the second distance 98.

In one or more embodiments, the first raised protrusion 40 can be about 4.25 millimeters in height with a width of about 2 millimeters at its base. With the digit hood 10 disposed over a digit, the first raised protrusion 40 can be positioned about 7 millimeters from a nail of the digit.

In one or more embodiments, the second raised protrusion 42 can be positioned about 2 millimeters below the first raised protrusion 40 and about 5.5 millimeters away from the first axis 92. The second raised protrusion 42 can have a height of about 1 millimeter and a width of about 2 millimeters.

In one or more embodiments, the third raised protrusion 44 can be positioned about 2 millimeters below the first raised protrusion 40 and about 5.5 millimeters away from the first axis 92, opposite the second raised protrusion 42. The third raised protrusion 44 can have a height of about 1 millimeter and a width of about 2 millimeters.

In one or more embodiments, the distance between the fourth raised protrusion 46 and the first raised protrusion 40 can be about 7.5 millimeters. The fourth raised protrusion 46 can have a height and width of about 2 millimeters.

In one or more embodiments, a length of the digit hood 10, excluding the tongues, such as the first tongue 52, can be about 4.6 millimeters.

Figure 4A:
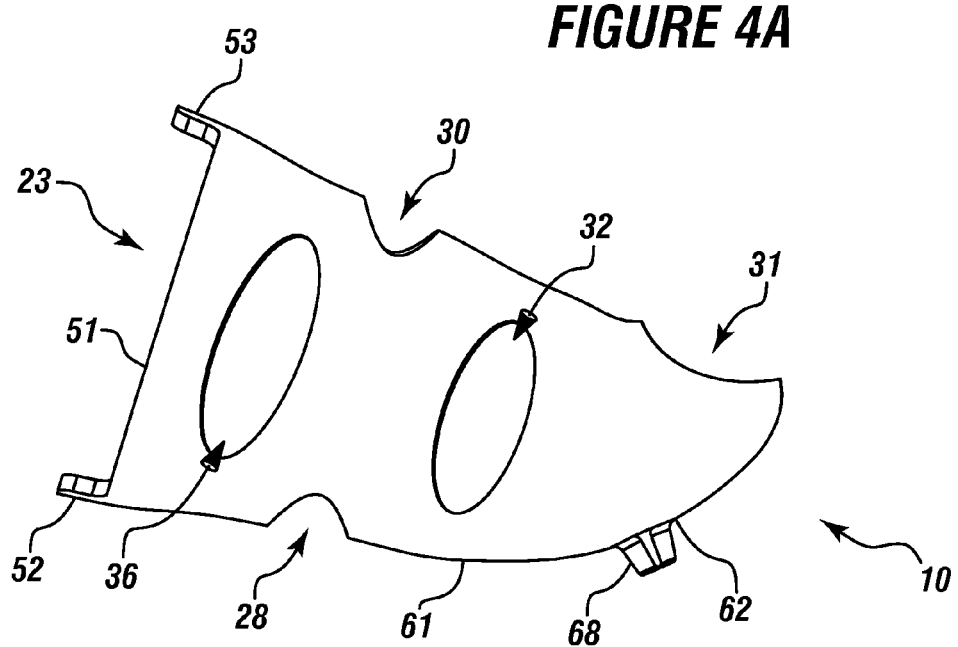
FIGS. 4A-4B depict another embodiment of a digit hood having a single raised protrusion.

FIG. 4A depicts a digit hood 10 with a digit pad side 61 having a digit pad side apex 62.

A first raised protrusion 68 can be connected to the digit hood 10 at the digit pad side apex 62. The first raised protrusion 68 can be a raised point digit stylus with a non-deformable surface.

The digit hood 10 can include a slit 31, such that users having long nails can utilize the digit hood 10. For example, users with nails having a length that is greater than 1 centimeter can use one or more embodiments of the digit hood 10.

The digit hood 10 can include an opening 23 with a perimeter 51 for receiving a digit. A first tongue 52 and a second tongue 53 can be disposed on the perimeter 51 for aiding the user in putting the digit hood 10 onto the digit.

For example, the opening 23 and the perimeter 51 can be configured to receive digits, and each tongue 52 and 53 can be configured to be gripped by a user for engaging the cover over a digit.

The digit hood 10 can also include a first joint hole 28, a second joint hole 30, a first ventilation hole 32, and a third ventilation hole 36.

Figure 4B:
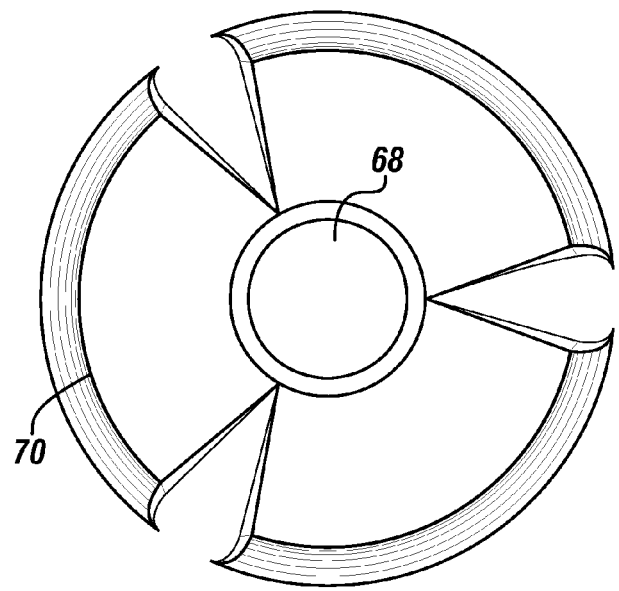

FIG. 4B depicts the first raised protrusion 68 shown in FIG. 5A as a raised point digit stylus with a non-deformable surface 70. The non-deformable surface 70 can be shaped as depicted, or can have another shape.

FIG. 5 depicts a hand 14 with multiple digit hoods.

In operation, a user can have multiple digit hoods, each disposed over a different digit on one or both hands of the user.

A first digit hood 10a can be disposed over a first digit 13a, shown here as a thumb.

A second digit hood 10b can be disposed over a second digit 13b, shown here as an index finger.

As such, the user can use the digit hoods 10a and 10b to increase the user's typing and/or texting speed and accuracy, as well as to type and/or text more comfortably and ergonomically.

The second digit hood 10b on the second digit 13b can have a single raised protrusion that can be used in combination with the first digit hood 10a to type and/or text, or the second digit hood 10b can have multiple raised protrusions.

The first digit hood 10a is depicted with a first joint hole 28 disposed proximate a joint 12, a first ventilation hole 32, a third ventilation hole 36, a first tongue 52, and a second tongue 53.

Figure 6:
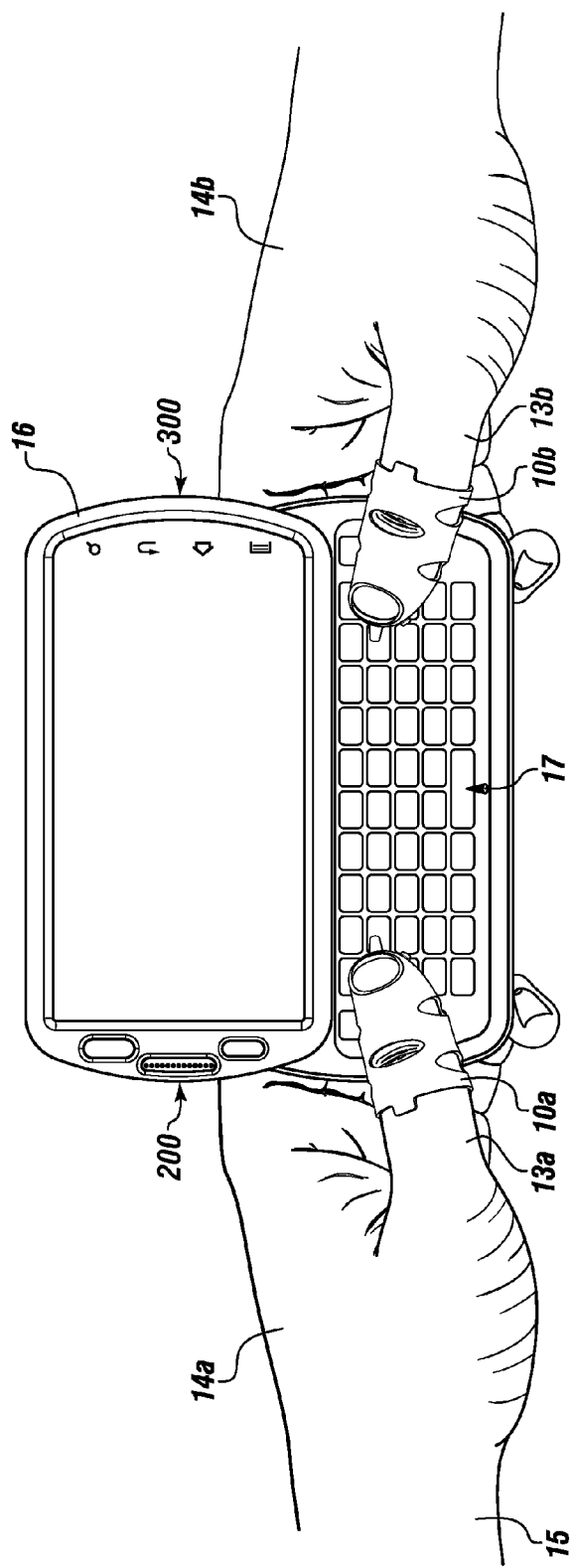
FIG. 6 depicts a user using two digit hoods to text on a hand held device.

FIG. 6 depicts a user 15 with a first digit hood 10a on a first digit 13a of a first hand 14a. The user 15 is also shown with a second digit hood 10b on a second digit 13b of a second hand 14b.

The user 15 is shown typing and/or texting on keys 17 of a hand held device 16 with the first digit hood 10a and the second digit hood 10b.

The hand held device 16 can be a touch screen device with displayed touch screen keys, a device with a keyboard having physical keys, a wireless cellular phone, a personal digital assistant, a hand held gaming device, a computer tablet, text capable phones, hand held game controllers, hand held shipping devices, other devices that user's can hold in their hand that require the use of one or more digits to provide data input, or the like. Many hand held devices have small keys, which can be easily actuable utilizing the digit hood 10 with the one or more raised protrusions.

For example, the user 15 can engage the hand held device 16, such that the user's first digit 13a extends over the keys 17 from a left side 200 of the keys 17, and such that the user's second digit 13b extends over the keys 17 from a right side 300 of the keys 17. As such, the user's first digit 13a can extend from the left side 200 of the keys 17 and horizontally towards the right side 300 of the keys 17, while the user's second digit 13b can extend from the right side 300 of the keys 17 and horizontally towards the left side 200 of the keys 17.

In operation, if the user 15 wants to text the words "car honks", the user can first use the first digit 13a to move towards the right side 300 of the keys 17 and roll downwards to a bottom of the keys 17 to engage the "c" key with a second raised protrusion of the first digit hood 10a.

The user 15 can then move the first digit 13a upwards and to the left side 200 of the keys 17 to engage the "a" key with a fourth protrusion of the first digit hood 10a.

The user 15 can then move the first digit 13a to the right side 300 of the keys 17 and upwards to engage the "r" key with a third raised protrusion of the first digit hood 10a.

The user can then move the first digit 13a downwards and towards the right side 300 of the keys 17 to engage a "space bar" key using a first protrusion of the first digit hood 10a.

The user 15 can then use a first raised protrusion of the second digit hood 10b to engage the "h" key of the keys 17.

The user 15 can then move the second digit 13b towards the right side 300 of the keys 17 and roll the second digit 13b upwards towards the top side of the keys 17 and use a second raised protrusion of the second digit hood 10b to engage the "o" key.

The user 15 can then move the second digit 13b to the left side 200 of the keys 17 and roll the second digit 13b downwards towards the bottom of the keys 17 to engage the "n" key with a third raised protrusion of the second digit hood 10b.

The user 15 can then roll the second digit 13b towards the right side 300 of the keys 17 and engage the "k" key with a fourth raised protrusion of the second digit hood 10b.

The user 15 can then move the first digit 13a to a left side 200 of the keys 17 and engage the "s" key with the fourth raised protrusion of the first digit hood 10a.

As such, the user 15 can text and/or type on the hand held device 16 with the user's thumbs, first digit 13a and second digit 13b, engaged over the keys 17 from the right side 300 and the left side 200 of the hand held device 16, rather than from the bottom of the hand held device 16, thereby providing for a more ergonomic texting and/or typing.

Figure 7B:
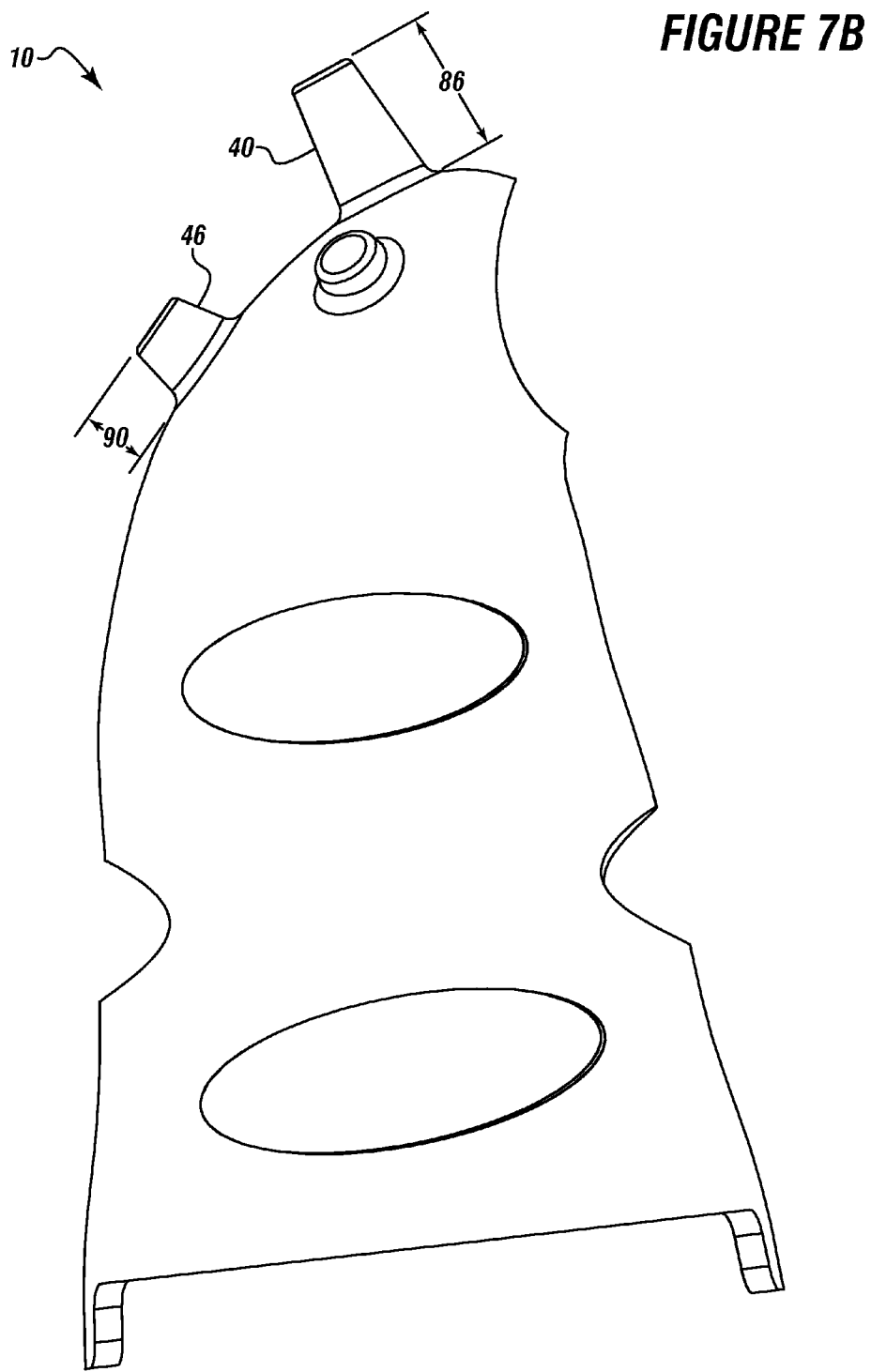

FIGS. 7A-7B depict a digit hood 10 with raised protrusions having various heights.

Referring to FIGS. 7A-7B, the first raised protrusion 40 can have a first height 86.

The second raised protrusion 42 and the third raised protrusion 44 can each have a second height, including second height 88a and second height 88b. The second heights 88a and 88b can be less than the first height 86.

The fourth raised protrusion 46 can have a third height 90. The third height 90 can be less than the first height 86 and greater than the second heights 88a and 88b.

In one or more embodiments, the first height 86 can range from about 2.5 millimeters to about 5 millimeters, the second heights 88a and 88b can range from about 0.9 millimeters to about 1.25 millimeters, and the third height 90 can range from about 0.75 millimeters to about 1.5 millimeters. Each of the heights 86, 88a, 88b, and 90 can range from about 0.75 millimeters to about 5 millimeters, or any size range depending upon the particular application.

While these embodiments have been described with emphasis on the embodiments, it should be understood that within the scope of the appended claims, the embodiments might be practiced other than as specifically described herein.

What is claimed is:

1. A digit hood to enable a user to quickly and accurately actuate keys of a hand held device, wherein the digit hood is configured to be disposed about a digit of a user, the digit hood comprising:
   a cover comprising: an elongated body having a closed end and an opened end, wherein a channel is formed from the opened end to an inner surface of the closed end, wherein at least one tongue has a first end connected with the opened end and a second end extending freely from the opened end, wherein the elongated body terminates at the opened end, wherein the closed end is spaced from the opened end by a distance that is great enough to allow the cover to operatively engage at least a portion of the digit, and wherein the cover is configured to leave other portions of a hand unencumbered while allowing the user to maintain proper hand, wrist, and thumb positioning while texting or typing; and
   a first raised protrusion, a second raised protrusion, a third raised protrusion, and a fourth raised protrusion, extending from the cover, wherein the first raised protrusion and the fourth raised protrusion are intersected by a first axis, wherein the second raised protrusion and the third raised protrusion are intersected by a second axis, and wherein the first axis intersects the second axis between the first raised protrusion and the fourth raised protrusion and between the second raised protrusion and the third raised protrusion; wherein
      the second raised protrusion is oriented at a first angle from the first raised protrusion;
      the third raised protrusion is oriented at a second angle from the first raised protrusion; and
      the fourth raised protrusion is oriented at a third angle from the first raised protrusion,
      wherein each of the first, second and third angles range from forty five degrees to sixty degrees.

2. The digit hood of claim 1, wherein each of the raised protrusions has a tapered cylindrical shape, and wherein each of the raised protrusions tapers away from the cover.

3. The digit hood of claim 1, wherein:
   the first raised protrusion has a first height;
   the second raised protrusion and the third raised protrusion are each a second height less than the first height; and
   the fourth raised protrusion has a third height less than the first height and greater than the second height.

4. The digit hood of claim 1, wherein each of the raised protrusions comprises a non-deformable surface for engagement with the keys, wherein each of the non-deformable surfaces is a polymer, a rubber, or a graphite, and wherein when the digit hood is disposed over the digit of the user the digit hood is configured to allow the user to quickly and accurately actuate the keys.

5. The digit hood of claim 1, wherein the cover comprises a cover inside and a cover outside, and wherein each of the raised protrusions is connected from the cover inside to the cover outside.

6. The digit hood of claim 1, wherein the first raised protrusion and the fourth raised protrusion are both disposed along a first axis, wherein the second raised protrusion and the third raised protrusion are both disposed along a second axis, and wherein the second axis intersects the first axis between the first raised protrusion and the fourth raised protrusion.

7. The digit hood of claim 6, wherein a distance between the second raised protrusion and the first raised protrusion is equal to a distance between the third raised protrusion and the first raised protrusion.

8. The digit hood of claim 7, wherein the third raised protrusion and the second raised protrusion are equidistantly spaced apart from the first axis.

9. The digit hood of claim 8, wherein a distance between the fourth raised protrusion and the second raised protrusion is equivalent to a distance between the fourth raised protrusion and the third raised protrusion.

10. The digit hood of claim 1, wherein each of the raised protrusions extends from a pad side of the cover.

11. The digit hood of claim 1, wherein the first raised protrusion comprises a concave tip, a scored tip, a suction cup tip, or a tip made of a non-slip material.

12. The digit hood of claim 1, further comprising a plurality of joint holes disposed through the cover, wherein each of the joint holes is configured to be disposed proximate a joint of the digit when the cover is disposed over the digit to allow the digit to bend.

13. The digit hood of claim 12, further comprising a plurality of ventilation holes disposed through the cover, wherein each of the ventilation holes is configured to provide ventilation to the digit.

14. The digit hood of claim 13, wherein each of the ventilation holes and each of the joint holes has an elliptical shape.

15. The digit hood of claim 1, further comprising a slit disposed through the cover opposite the opened end, wherein the slit is configured to receive a nail of the digit.

16. The digit hood of claim 1, wherein the cover comprises a digit pad side having a digit pad side apex, wherein the digit pad side apex is disposed at an apex of the digit when the digit hood is disposed on the digit, and wherein the first raised protrusion is connected to the cover at the digit pad side apex.

17. The digit hood of claim 16, wherein the first raised protrusion comprises a raised point digit stylus with a non-deformable surface.

18. The digit hood of claim 1, further comprising an attachment device on the cover for providing and maintaining engagement between the cover and the digit, wherein the attachment device is a semi-rigid band or an adjustable strap.

19. The digit hood of claim 1, wherein the hand held device is a touch screen device with displayed touch screen keys, a device with a keyboard having physical keys, a wireless cellular phone, a personal digital assistant, a hand held gaming device, or a computer tablet.

* * * * *